United States Patent

[11] 3,622,477

| [72] | Inventor | John Edward Colchester<br>Runcorn, England |
| [21] | Appl. No. | 804,651 |
| [22] | Filed | Mar. 5, 1969 |
| [45] | Patented | Nov. 23, 1971 |
| [73] | Assignee | Imperial Chemical Industries Limited<br>London, England |
| [32] | Priority | Mar. 15, 1968 |
| [33] | | Great Britain |
| [31] | | 12,644/68 |

[54] SYNTHESIS OF N:N'-DISUBSTITUTED BIPYRIDYLIUM SALTS
14 Claims, No Drawings

[52] U.S. Cl.......................................................... 204/73,
260/296 D
[51] Int. Cl............................................................C07b 29/06,
C07d 31/02
[50] Field of Search............................................ 204/72–74;
260/296 Y, 296 D, 270

[56] References Cited
UNITED STATES PATENTS

| 3,159,641 | 12/1964 | Fanshawe et al. | 260/296 Y |
| 3,159,642 | 12/1964 | Fanshawe et al. | 260/296 Y |
| 3,210,360 | 10/1965 | Bradbury et al. | 260/296 Y |

FOREIGN PATENTS

| 1,075,323 | 7/1967 | Great Britain | 260/296 Y |

Primary Examiner—F. C. Edmundson
Attorney—Cushman, Darby & Cushman

ABSTRACT: There is provided a process for the production of 1,1'-disubstituted-4,4'-bipyridylium salts which comprises reducing an N-substituted 4-cyanobipyridinium salt electrolytically or by means of a reducing agent under conditions whereby free cyanide ions are removed from the reaction medium as they are liberated, for example by carrying out the reduction in the presence of a cyanide ion sequestering agent.

SYNTHESIS OF N:N'-DISTRIBUTED BIPYRIDYLIUM SALTS

This invention relates to the synthesis of N,N'-disubstituted bipyridylium salts and more particularly to a process for the production of 1,1'-disubstituted 4,4'-bipyridylium salts.

According to the present invention there is provided a process for the production of 1,1'-disubstituted-4,4'-bipyridylium salts which comprises reducing an N-substituted 4-cyanopyridinium salt under conditions whereby free cyanide ions are removed from the reaction medium.

It has been found that cyanide ions tend to attack the bipyridylium salt produced by reduction of the 4-cyanopyridinium salt and that the yield of bipyridylium salt can be enhanced by ensuring that free cyanide ions are removed from the reaction medium as they are liberated.

The free cyanide ions may be removed from the reaction medium by carrying out the reduction in the presence of a compound which reacts with the cyanide ions, but which does not hinder the reduction for example by interaction with one or both of the reagents. Suitable compounds include cyanide ion sequestering agents, for example transition metal compounds and anion exchange resins e.g. the resin known as 'Amberlite' I.R.A.–400. It is preferred, when using an anion exchange resin, to use the resin in such a form that absorption of cyanide ions does not cause release of hydroxyl ions which can also attack bipyridylium ions; it is preferred that the resin releases halide, e.g. chloride, ions. Suitable transition metal compounds are those which form stable complexes with cyanide ions and include for example iron salts.

We envisage a continuous process in which (1) the 4-cyanopyrinidium salt and a cyanide ion sequestering agent are fed to a reduction zone, (2) the reaction mixture is removed from the reduction zone (3) the reaction mixture in one or more separate and subsequent zones is treated to recover (a) unreacted 4-cyanopyridinium salt for recycle to the reaction zone (b) the sequestering agent together with absorbed or destroyed cyanide ions, the sequestering agent being regenerated for recycle to the reduction zone, and (c) the bipyridylium salt in a saleable form, for example as an aqueous solution.

The substituent on the nitrogen atom of the pyridine nucleus may be any inert substituent which does not interfere with the present reaction, for example a hydrocarbon radical preferably an alkyl (e.g. methyl) or aralkyl group or a substituted hydrocarbon group for example a carbamyl-alkyl and preferably a carbamyl-methyl group. The pyridinium salt may also carry inert substituents, for example alkyl groups, on the carbon atoms of the pyridine nucleus other than the four carbon atom. The inert substituent should preferably not sterically hinder the four-position.

The pyridinium salt may have any inert anion which does not interfere substantially with the present reaction, for example a halide and especially an iodide, or a sulfate or a methyl-sulfate anion.

The reduction may be carried out electrolytically or by means of a reducing agent. Reducing agents suitable for use in the present process include both organic and inorganic reducing agents and we have found that particularly suitable are reducing agents having a redox potential more negative than −0.75 and preferably more positive than −1.09 volts in an aqueous system with respect to a saturated calomel electrode. Suitable inorganic reducing agents include active metals and metal compounds, for example alkali metal amalgams, magnesium, aluminum and zinc. When metals are used in solid form they are preferably used in a finely divided state to promote contact with the pyridinium salt. The reducing agent and the reaction conditions used should preferably be such that the cyano group in the four-position of the pyridinium salt is not hydrolyzed unduly and should also preferably be such that other substituents, for example the N-substituents on the pyridine nucleus are not reduced.

Electrolytic reduction may be carried out in a manner and using apparatus conventionally used to carry out electrolytic reductions and may be conveniently carried out by the use of controlled-potential electrolysis. When using controlled-potential electrolysis it is preferred to use a potential in the range −0.75 volt to −1.09 volts and especially −0.80 volt to −1.09 volts with respect to the saturated calomel electrode. It has been found that use of potentials more negative than −1.16 volts tends to produce unwanted byproducts.

The bipyridylium salt may be reduced further under the conditions of the reduction to the bipyridylium cation radical but this radical can easily be oxidized back to the bipyridylium cation, for example by means of air.

Pyridinium salts are generally ionic solids which are soluble in polar solvents. It is therefore convenient in order to obtain intimate contact between the reducing agent and the pyridinium salt to use a solution of the pyridinium salt in a polar solvent. It is of course desirable that the reducing agent should not react with the solvent. Water is a convenient solvent for the pyridinium salt when the reducing agent and in particular a metal, is used in a form which does not react with water to any appreciable extent under the reaction conditions. An alternative polar solvent is acetonitrile.

The reaction may be carried out very simply by mixing the pyridinium salt, conveniently as a solution, with the reducing agent conveniently at a temperature between 20° and 120° C. and preferably between 40° and 90° C. Suitable reaction times vary with the particular reagents and reaction conditions employed but are usually between 30 minutes and 24 hours.

Preferably the pH of the reaction medium is maintained at less than about 10 especially less than about 8 in order to avoid hydrolysis of the four-cyano group of the pyridinium salt and to avoid destruction of the bipyridylium salt which tends to occur in excessively alkaline media.

The pyridinium salt may be used in solution in a polar solvent in any concentration up to saturation; however very dilute solutions will involve the handling of a large volume of liquid and will tend to be inconvenient.

The ratio of the amount of the reducing agent to the amount of the pyridinium salt should be such that sufficient reducing agent is present to add one electron to each pyridinium ion present.

The bipyridylium salts can be isolated from the reaction mixture by conventional techniques for example by evaporation of excess solvent followed by crystallization of the bipyridylium salt from the remaining solvent or by using techniques more fully described in U.K. Pat. specification No. 1,073,824.

The invention is illustrated but in no way limited by the following examples.

EXAMPLE 1

6.6 g. of 1-methyl-4-cyanopyridinium methyl sulphate were dissolved in 100 ml. of water and the solution was added dropwise to a mixture of 1.42 g. of zinc dust and 2 g. of ferrous sulphate heptahydrate in 100 ml. of water at a temperature of 80° C. The resulting mixture was purged with air and then maintained in a well-stirred state for 1 hour at a temperature of 80° C. At the end of this time 200 ml. of N/10 aqueous HCl were added and the mixture was warmed for 30 minutes to remove hydrogen cyanide. The resulting solution was found by polarographic analysis to contain a proportion of 1,1'-dimethyl-4,4'-bipyridinium salt corresponding to a yield of 31 percent based on the 4-cyanopyridinium salt fed to the reaction.

EXAMPLE 2

The process of example 1 was repeated with the exception that 40 g. of an anion exchange resin (known as 'Amberlite' I.R.A.–400 (Cl) ) replaced the ferrous sulphate heptahydrate. The yield of bipyridylium salt was found to be 40 percent based on the 4-cyanopyridinium salt fed.

EXAMPLE 3

The process of example 2 was repeated using 40 g. of an ion exchange resin (known as 'Amberlite' I.R.A.-45 (OH) ) in place of the 'Amberlite' I.R.A.-400 (Cl). The yield of bipyridylium salt was found to be 11 percent based on the 4-cyanopyridinium salt fed thus illustrating the deleterious effect of the presence of OH-ions on the yield of this reaction.

What we claim is:

1. A process for the production of 1,1'-disubstituted-4,4'-bipyridylium salts which comprises reducing an N-substituted 4-cyanopyridinium salt in a polar solvent electrolytically at a potential between −0.75 and −1.16 volts compared to a saturated calomel electrode or by means of a reducing agent which has a redox potential in an aqueous medium between −0.75 and −1.16 volts compared to a saturated calomel electrode, under conditions whereby free cyanide ions are removed from the reaction medium by a compound which is a cyanide sequestering agent as they are liberated.

2. A process as claimed in claim 1 wherein a compound of a transition metal is employed as the sequestering agent.

3. A process as claimed in claim 2 wherein the transition metal compound forms a stable complex on reaction with free cyanide ions.

4. A process as claimed in claim 3 wherein the transition metal compound is an iron salt.

5. A process as claimed in claim 1 wherein the solvent is water.

6. A process as claimed in claim 1 wherein the reduction is carried out at a pH of less than 10.0.

7. A process as claimed in claim 6 wherein the pH is less than 8.0.

8. A process as claimed in claim 1 wherein the reduction is carried out at a temperature of from 20° to 120° C.

9. A process as claimed in claim 8 wherein the temperature is from 40° to 90° C.

10. A process as claimed in claim 1 wherein the reducing agent is an active metal.

11. A process as claimed in claim 10 wherein the active metal is zinc.

12. A process as claimed in claim 10 wherein sodium amalgam is employed.

13. A process as claimed in claim 10 wherein the metal is in a finely divided form.

14. A process as claimed in claim 1 wherein the electrode potential is from −0.75 volt to −1.09 volts.

* * * * *